(12) United States Patent
Chang (10) Patent No.: US 7,680,995 B1
(45) Date of Patent: Mar. 16, 2010

(54) DATA REPLICATION SYSTEM AND METHOD FOR CLUSTERED SYSTEMS

(75) Inventor: Kevin K. Chang, Valinda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 715 days.

(21) Appl. No.: 10/299,616

(22) Filed: Nov. 19, 2002

(51) Int. Cl.
G06F 12/00 (2006.01)
G06F 11/00 (2006.01)
G11C 11/34 (2006.01)

(52) U.S. Cl. .................. 711/162; 714/6; 714/E11.001; 365/185.09

(58) Field of Classification Search .................. 711/161, 711/162, 141, 145; 707/203; 714/6, E11.001; 365/185.09
See application file for complete search history.

(56) References Cited

U.S. PATENT DOCUMENTS 5,832,514 A * 11/1998 Norin et al. .................. 707/202
6,304,882 B1 * 10/2001 Strellis et al. ............... 707/202
6,367,046 B1 * 4/2002 Chapman et al. ............ 714/752

OTHER PUBLICATIONS

Error Correction with Hamming Codes, 1994 (http://www.rad.com/networks/1994/err_con/hamming.htm).

* cited by examiner

Primary Examiner—Christian P Chace
Assistant Examiner—Mehdi Namazi
(74) Attorney, Agent, or Firm—Kraguljac & Kalnay, LLC (57) ABSTRACT

In a clustered processing system, replication logic controls replication of object data to one of more replica instances. Correction logic generates correction data based on the object data and generates code words by combining the object data and the correction data. The code words are transmitted to the one or more replica instances such that correctable errors in the object data can be corrected without re-transmission of the object data.

26 Claims, 3 Drawing Sheets

Figure 3

DATA REPLICATION SYSTEM AND METHOD FOR CLUSTERED SYSTEMS

CROSS REFERENCE TO RELATED APPLICATION

This application is related to U.S. patent application entitled "Delta Object Replication System and Method For Clustered System", Ser. No. 10/321,336 filed Dec. 17, 2002, inventor: Chang et al., which is also assigned to the present assignee.

FIELD OF THE INVENTION

The invention relates to the data replication arts. It finds particular application to a clustered system having a data replication system and method.

BACKGROUND

A cluster is a set of application server instances, running on independent servers, configured to act in concert to deliver greater scalability and availability than a single instance can provide. While a single application server instance can only leverage operating resources of a single host, a cluster can span multiple hosts, distributing application execution over a greater number of CPUs. While a single application server instance is vulnerable to the failure of its host and operating system, a cluster configured for high availability (HA) continues to function despite the loss of an operating system or host, hiding any such failure from clients.

In enterprise applications that are clustered, servers may be configured to broadcast states (sessions) for in-memory replication. This ensures that when one server goes down, the clients will immediately redirect to the server that has backed-up all the other states. Hence the transactions are continued without interruption.

While the replication process is relatively cheap for two servers that back each other up, it is time consuming for a configuration with three or more servers. In prior systems, when a server receives a state update request from a client, it broadcasts its latest states and waits for acknowledgements from all other servers in the cluster. However, since the broadcast protocol is usually using the datagram protocol (which is unreliable), messages are occasionally dropped and the states need to be broadcasted again.

As the number of servers in a cluster increase, the probability of dropped messages also increase. As a result, the latency, which is the time between a client/server request, also increases. This is unacceptable for certain applications when the client/server response time is critical. In one preliminary test, the message drop rate (error in data or lost data) was about 20%. Of course, this percentage fluctuates in different environments and situations. So in a three server configuration, each server will broadcast and wait for the other two servers and each independently has a 20% chance of message drop. Hence the probability of a message re-send (and client/server latency) increases drastically with the number of HA servers in the cluster—the more redundancy configured in the cluster, the more latency between the client and the server is observed in such configuration.

The present invention provides a new and useful method and system of object replication that addresses the above problems.

SUMMARY

In one embodiment, a system of replicating object data from a container instance within a clustered processing system is provided. A replication logic controls replication of object data from a container instance to one or more replica instances. A correction logic generates correction data based on the object data and generates code words by combining the object data and the correction data. The code words being transmittable to the one or more replica instances such that correctable errors in the object data can be corrected or reconstructed without re-transmission of the object data.

In accordance with another embodiment, a method of replicating instance data from an application instance in a clustered processing system is provided. The method includes dividing instance data from the application instance into a plurality of data packets. For each data packet, a set of correction messages are generated and added to the data packet where the set of correction messages are encoded from the data packet based on a correction function. Each of the data packets and the set of correction messages are transmitted to one or more failover instances which replicate a current state of the application instance and, if a portion of a data packet is received in error by a failover instance, the portion of the data packet is re-generating by decoding the data packet and the correction messages based on the correction function.

BRIEF DESCRIPTION OF THE DRAWINGS

In the accompanying drawings which are incorporated in and constitute a part of the specification, embodiments of a system and method are illustrated, which together with the detailed description given below, serve to describe the example embodiments of the system and method. It will be appreciated that the illustrated boundaries of elements (e.g. boxes or groups of boxes) in the figures represent one example of the boundaries. One of ordinary skill in the art will appreciate that one element may be designed as multiple elements or that multiple elements may be designed as one element. An element shown as an internal component of another element may be implemented as an external component and vise versa.

DETAILED DESCRIPTION OF ILLUSTRATED EMBODIMENTS

The following includes definitions of selected terms used throughout the disclosure. Both singular and plural forms of all terms fall within each meaning:

"Computer-readable medium" as used herein refers to any storage medium that participates in directly or indirectly storing and providing instructions and/or data. Such a medium may take many forms, including but not limited to, non-volatile media, and volatile media. Non-volatile media may include, for example, optical or magnetic disks. Volatile media may include dynamic memory. Common forms of computer-readable media include, for example, a floppy disk, a flexible disk, hard disk, magnetic tape, or any other magnetic medium, a CD-ROM, any other optical medium, any other physical medium with patterns of holes, a RAM, a PROM, an EPROM, a FLASH-EPROM, any other memory chip or cartridge, or any other medium from which a computer or processor can read.

"Logic", as used herein, includes but is not limited to hardware, firmware, software stored on a computer-readable medium and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software stored on a computer-readable storage medium.

"Signal", as used herein, includes but is not limited to one or more electrical signals, analog or digital signals, a change in a signal's state (e.g. a voltage increase/drop), one or more computer instructions, messages, a bit or bit stream, or other means that can be received, transmitted, and/or detected.

"Software", as used herein, includes but is not limited to one or more computer-readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"User", as used herein, includes but is not limited to one or more persons, software, computers or combinations of these.

Figure 1:
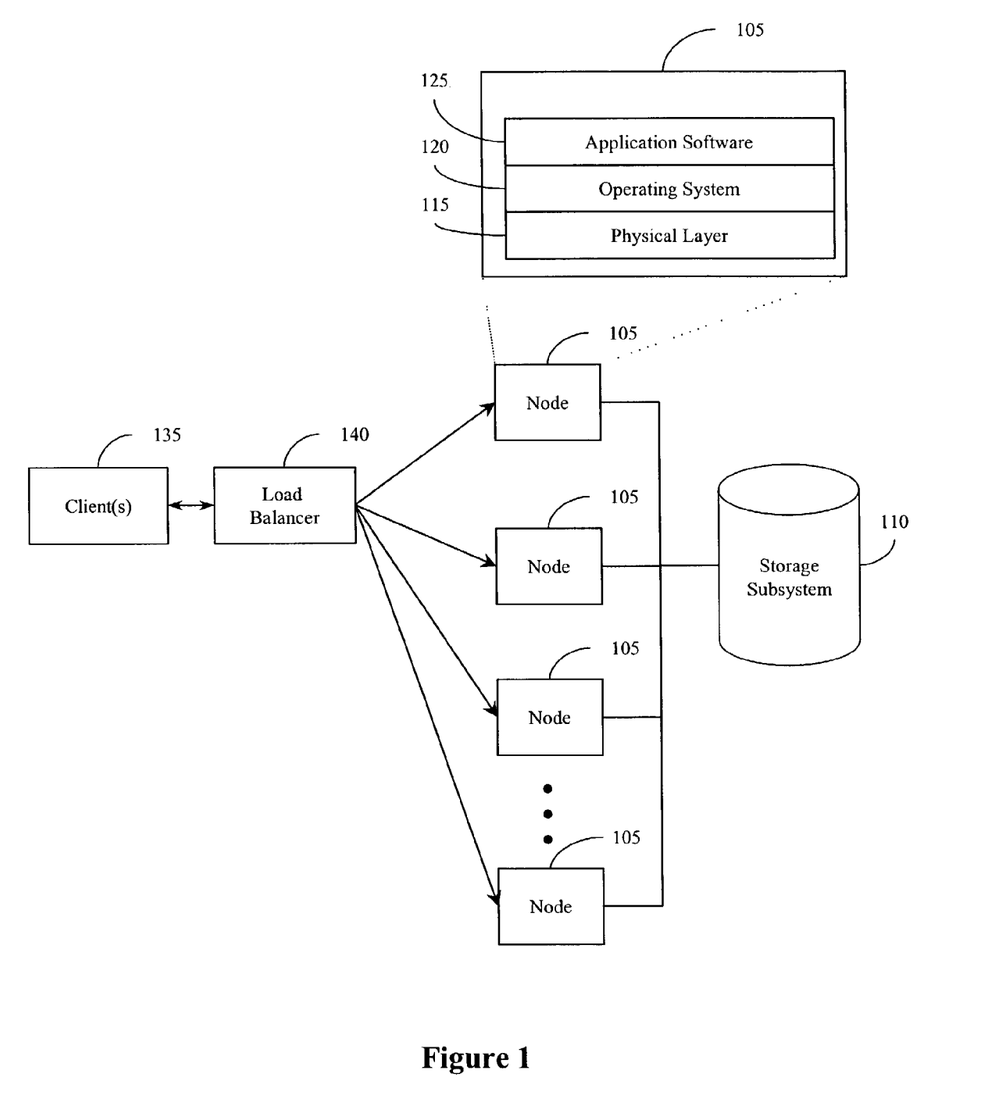
FIG. 1 is an example system diagram of one embodiment of a database cluster in accordance with the present invention.

Illustrated in FIG. 1 is one embodiment of a clustered system 100. A cluster is a group of independent servers or nodes 105 that collaborate as a single system. Cluster components may include one or more processor nodes 105, a cluster interconnect (private network) that provides one-to-one node, one-to-many nodes, or a combination of communication, and a storage subsystem 110 that maintains shared data files on one or more data storage devices. The nodes 105 may or may not share disk access and resources that manage the shared data files. Each node may be an independent computer system with its own physical layer 115 which includes a processor(s), system memory, communication hardware, and other physical components. It may also include its own operating system 120, and application software 125 which may include a clustered enterprise application, user interfaces, a database instance, and/or other application software. It will be appreciated that different numbers of nodes 105 may be used in the cluster, they may be clustered in different configurations, and each node may have a different configuration from other nodes. Clusters can provide improved fault resilience and modular incremental system growth over single symmetric multi-processors systems. In the event of subsystem failures, clusters that are configured for HA ensures high availability by synchronously replicating data. Redundant hardware components, such as additional nodes 105, interconnects, and shared disks, provide higher availability. Such redundant hardware architectures avoid single points-of-failure and provide fault resilience.

In one embodiment, one or more clients 135 may access directly to the node 105 or through a load balancer 140 which is programmed to send client requests to any application server instance in nodes 105 in the cluster 100. The load balancer 140 may be a separate server or a software subsystem within one or more nodes 105. The client 135 may access the cluster through the Internet, an intranet or other communication network.

Figure 2:
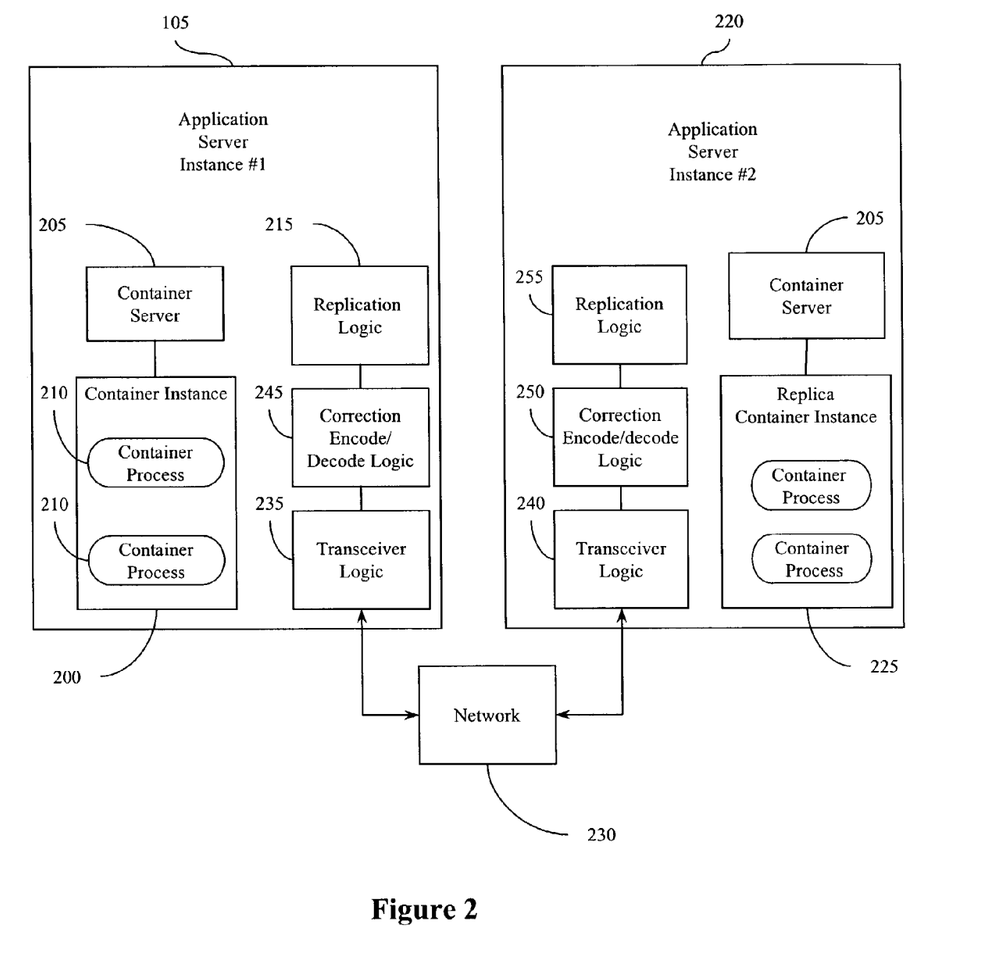
FIG. 2 is a diagram of one embodiment of a replication system within a cluster node.

Illustrated in FIG. 2 is an example configuration of a node 105 in the clustered processing system 100 having a data replication system. In this embodiment, the node 105 is configured to execute a business enterprise application such as on a Java 2 Enterprise Edition (J2EE) platform, a Microsoft .NET platform or another desired platform. The following description will be based on a J2EE platform. Of course, other types of software products and applications may be used rather than a business enterprise application. The system may also be implemented on various operating systems such UNIX, Windows, Linux or other available systems.

Each node 105 is an application server that is configured and programmed by software to provide a J2EE environment, typically referred to as a container for J2EE. One example is Oracle Container for Java (OC4J) software. The container, which can have one or more container instances 200, is programmed in Java and executes on a standard Java Development Kit (JDK) virtual machine. It provides a J2EE environment that includes a Java Server Page (JSP) translator, a Servlet engine, an Enterprise Java Beans (EJB) container and other J2EE services such as JNDI, Java Database Connectivity (JDBC), Java Message Service (JMS) and others.

With further reference to FIG. 2, the node 105 may include a container server 205 such as a web server that serves client requests. In addition, the container server 205 forwards container requests to an active container process 210 (described below). Because of this function, the server 205 acts like a load balancer for container instances 200. When the cluster includes a single application server instance, the container server 205 would handle incoming requests for all of the container processes 210 in this sole application server instance. However, in a clustered environment configured for HA, the each container server 205 is updated with information about existing container processes 210 in all application server instances in the cluster. Thus, any container server 205 can replicate incoming requests among any container process 210 in the cluster. This is performed by logic within each application server instance that notifies each container server 205 of all container processes 210 when they are initialized.

Thus, the container server 205 can be programmed to forward an incoming stateless request to any container process 210 in the cluster. Although a variety of priorities can be set, one preference can be to forward an incoming request first to a container process 210 in its own application server instance. If none are available, it will forward the request to any container process 210 in another application server instance in the cluster. The container server 205 may also forward an incoming stateful request to a particular container process 210 where a conversation originated. If the container process 210 has failed, the server 205 forwards the request to another container process that has a replicated state of that application. This will be described in greater detail below.

A container instance 200 is an entity to which J2EE applications are deployed and configured. Within the application sever instance 105, one or more container instances 200 can be configured, each with its own number of container processes 210. The container instance 200 defines how many container processes 210 exist within the application server 105 and the configuration for the container processes. A container process 210 is what executes the J2EE applications for the container instance 200. Each container instance 200 can be configured with one or more container processes 210. When an application is deployed to a container instance 200, the instance deploys the application to some or all container processes defined in the container instance. The container instance 200 is also responsible for replicating the state of its applications. To provide failover, a container instance 200 can be replicated on one or more application server instances 105 in the cluster.

A container process 210, in this embodiment, is a Java Virtual Machine (JVM) process that executes J2EE applications. All applications deployed to a container instance 200 are deployed to some or all if its container processes 210. As mentioned previously, one or more container processes 210 within a container instance 200 can be defined, so that J2EE requests can be load balanced and have failover capabilities. Each node 105 that has an installed application server instance can have different capabilities. To optimize a node's hardware capabilities, the number of container processes 210 in each container instance 200 can be configured to properly suit the hardware capabilities.

With further reference to FIG. 2, the application server instance 105 includes a replication logic 215 to control replication of an object within the instance. In one embodiment, replication is in-memory replication and is performed dynamically as the object changes states. Replicating data to another node in the cluster creates a failover instance so that processing can continue if processing were interrupted for any reason. Any portion of the server instance 105, which will be referred to as an object, can potentially be replicated including the entire state of the server instance 105, any container instance 200, one or more container processes 210 and combinations of these. The data within an object will be generally referred to as object data or instance data. Object data is typically maintained in an abstract form including pointers, addresses, and other links to the actual data. When replicating object data, the data is converted to a serialized form before it can be transmitted to another server. For example in Java, the only objects that can be replicated are Serializable objects.

In the following example, the container instance 200 will be replicated on a node 220 as a replica container instance 225. It will be appreciated that replication can be made to all nodes in the cluster and is done so in an HA configuration. In that regard, replication logic 215 is programmed to prepare data for replication from container instance 200 at designated times. For example, instance data may be replicated at predetermined time intervals, replicated based on a triggering event such as a state change, or other desired times. For critical applications, such as purchasing or other financial transactions, replication occurs at each state or object change. In one embodiment, the replication logic 215 includes serializer logic that serializes the instance data into messages having a equal predetermined lengths, for example eight (8) messages of equal length per data, each message corresponding to each bit position in the data. This is one of the many different possible ways to prepare and configure the instance data to be transmitted to other nodes in the cluster. Each message may also include header information, source and destination information, and/or other data that may be required based on the communication protocol being used. In the foregoing discussion, a message, packet and bit will be used synonymously.

In this embodiment, the communication protocol is a multicast protocol that broadcasts data packets to all nodes in the cluster over a network 230. Transceiver logic 235 may be a network card or other network communication device for controlling data communication. Each node in the cluster includes a similar transceiver logic 240. A few examples of other communication protocols that may be used for transceiver logic 235 and the network 230 include any forms of IP datagram such as UDP, protocols built on top of the above, a proprietary protocol or some combination of the above, among other possibilities.

With further reference to FIG. 2, after the instance data is configured into packets, a correction encoder/decoder logic 245 generates one or more correction bits for each packet based on a selected correction function. In one embodiment, the correction function is based on a Hamming code. Generally speaking, a Hamming code creates one or more correction parity bits that are a function of the data in the packet. As will be described in greater detail below, the combination of data and correction bits creates a code word that has a predefined set of variations that can be mapped back to the original data. Thus, a receiving node can detect and, to some extent based on the correction logic used, correct errors in the transmission if an invalid code word is received. In datagram communications, it is guaranteed that correct data is received or no data is received at all (termed "dropped"), so only erasure correction is concerned. By enabling a receiving node to recover erasures (dropped data), re-transmission of the data can be avoided or reduced which may reduce latency. In protocols that may include errors in data transmission, certain errors may be corrected as well.

In one embodiment, the correction encoder/decoder logic 245 is designed and programmed to generate correction bits based on a Hamming code described below and, to decode code words when received. Of course, other correction functions and codes can be used such as Reed-Solomon, Reed-Muller, Binary BHC codes (developed by Bose, Chaudhuri, and Hocquenghem), Golay code, Berlekamp-Massey algorithm, other linear codes or cyclic codes. A (n,k,3) Hamming code is an error-detecting and error-correcting binary code, used in data transmission, that can detect all single and double-bit errors and correct all single-bit errors. A Hamming code satisfies the relation $2^m >= n+1$, where n is the total number of bits in the block, k is the number of information bits in the block, and m is the number of check bits in the block, where $m=n-k$.

By encoding transmitted data with correction bits, a receiving node 220 has the ability to decode and correct a transmission error with its correction encode/decode logic 250. This is referred to as Forward Error Correction (FEC). This ability can increase the throughput of a data link operating in a noisy environment or in environments where low latency is desired such as a clustered enterprise application. The transmitting node appends information to the data in the form of error correction bits, but the increase in frame length may be modest relative to the cost of re-transmission. Hamming codes provide for FEC using a block parity mechanism that can be inexpensively implemented. In general, their use allows the correction of single bit errors and detection of two bit errors per unit data, called a code word. Once the transmitted data (code word) is accurately received, replication logic 255 in the receiving node 220 builds the replica container instance 225 with the code word and all other code words associated with the replica container instance 225.

The fundamental principal behind Hamming codes is parity. Hamming codes, as mentioned before, are capable of correcting one error or detecting two errors but not capable of doing both simultaneously. Hamming codes can be used as an error detection mechanism to catch both single and double bit errors or to correct single bit error. This is accomplished by using more than one parity bit, each computed on different combination of bits in the data.

The number of parity or error check bits required is given by the Hamming rule, and is a function of the number of bits of information transmitted. The Hamming rule is expressed by the following inequality (Equation 1):

$$d+p+1<=2^p \qquad (1)$$

where d is the number of data bits in a data packet and p is the number of parity bits. The result of appending the computed parity bits to the data bits is called the Hamming code word c. The size of the code word c is (d+p), and a Hamming code word is described by the ordered set (c, d).

Codes with values of p<=2 are hardly worthwhile because of the overhead involved. The case of p=3 is used in the following discussion to develop a (7,4) code using even parity, but larger code words are typically used in applications. A code where the equality case of Equation (1) holds is called a perfect code. A Hamming (7,4) code is a perfect code.

A Hamming code word is generated by multiplying the data bits by a generator matrix G using modulo-2 arithmetic. The result of the multiplication is called the code word vector (c1, c2, c3, ... cn), formed from the original data bits and the calculated parity bits. The generator matrix G used in constructing Hamming codes is formed by an identity matrix I and a parity generation matrix A: G[I : A]. An example of Hamming code (7,4,3) generator matrix G is:

$$G = \begin{array}{cccc|ccc} \multicolumn{4}{c|}{I} & \multicolumn{3}{c}{A} \\ 1 & 0 & 0 & 0 & 1 & 1 & 1 \\ 0 & 1 & 0 & 0 & 0 & 1 & 1 \\ 0 & 0 & 1 & 0 & 1 & 0 & 1 \\ 0 & 0 & 0 & 1 & 1 & 1 & 0 \end{array}$$

Another example of Hamming code (15,11,3) generator matrix G is:

$$G = \begin{array}{ccccccccccc|cccc} \multicolumn{11}{c|}{I} & \multicolumn{4}{c}{A} \\ 1 & 0 & 0 & 0 & 0 & 0 & 0 & 0 & 0 & 0 & 0 & 1 & 0 & 0 & 1 \\ 0 & 1 & 0 & 0 & 0 & 0 & 0 & 0 & 0 & 0 & 0 & 1 & 1 & 0 & 1 \\ 0 & 0 & 1 & 0 & 0 & 0 & 0 & 0 & 0 & 0 & 0 & 1 & 1 & 1 & 1 \\ 0 & 0 & 0 & 1 & 0 & 0 & 0 & 0 & 0 & 0 & 0 & 0 & 1 & 1 & 0 \\ 0 & 0 & 0 & 0 & 1 & 0 & 0 & 0 & 0 & 0 & 0 & 1 & 0 & 1 & 1 \\ 0 & 0 & 0 & 0 & 0 & 1 & 0 & 0 & 0 & 0 & 0 & 1 & 1 & 0 & 0 \\ 0 & 0 & 0 & 0 & 0 & 0 & 1 & 0 & 0 & 0 & 0 & 0 & 1 & 1 & 1 \\ 0 & 0 & 0 & 0 & 0 & 0 & 0 & 1 & 0 & 0 & 0 & 1 & 0 & 1 & 1 \\ 0 & 0 & 0 & 0 & 0 & 0 & 0 & 0 & 1 & 0 & 0 & 1 & 1 & 0 & 0 \\ 0 & 0 & 0 & 0 & 0 & 0 & 0 & 0 & 0 & 1 & 0 & 0 & 1 & 1 & 0 \\ 0 & 0 & 0 & 0 & 0 & 0 & 0 & 0 & 0 & 0 & 1 & 0 & 0 & 1 & 1 \end{array}$$

The following example is based on the (7,4,3) code. The multiplication of a 4-bit vector (d1, d2, d3, d4) by matrix G results in a 7-bit code word vector of the form (d1, d2, d3, d4, p1, p2, p3). It can be seen that the matrix A partition of G is responsible for the generation of the actual parity bits. Each column in matrix A represents one parity calculation computed on a subset of d. The Hamming rule requires that p=3 for a (7,4) code, therefore A must contain three columns to produce three parity bits.

If the columns of matrix A are selected so each column is unique, it follows that (p1, p2, p3) represents parity calculations of three distinct subset of d. As shown in Table (1) below, validating a received code word r, includes decoding logic that multiplies the received code word by a parity check to form s, the syndrome or parity check vector.

TABLE (1)

H = [A |I]

$$\begin{vmatrix} 1 & 0 & 1 & 1 & 1 & 0 & 0 \\ 1 & 1 & 0 & 1 & 0 & 1 & 0 \\ 1 & 1 & 1 & 0 & 0 & 0 & 1 \end{vmatrix} * \begin{vmatrix} 1 \\ 0 \\ 0 \\ 1 \\ 0 \\ 0 \\ 1 \end{vmatrix} = \begin{vmatrix} 0 \\ 0 \\ 0 \end{vmatrix}$$

H*r = s

If all elements of s are zero, the code word was received correctly. If s contains non-zero elements, the bit in error can be determined by analyzing which parity checks have failed, as long as the error involves only a single bit. For example, if r=[10/1001], s computes to [101], that syndrome ([101]) matches to the third column in H that corresponds to the third bit of r, which is the bit in error. It will be appreciated that when using datagram (multicast), it is guaranteed that no error is introduced during a transmission, only erasures may occur. Since this is also a systematic coding, meaning the original bits are preserved, if a receiving node receives all of the original message, there is no need to analyze for the syndrome. On the other hand, if any part of the original message is missing, then the system computes/reconstructs what the missing bit is by using the above method. In this discussion, the term "error" will be used generally to include either an inverted bit or an erasure. The types and sets of errors that are correctable by a selected correction function/logic are referred to herein as correctable errors.

From the practical standpoint of communications, a (7,4) code is not an optimal choice because it involves non-standard character lengths. Designing a suitable code requires that the ratio of parity to data bits and the processing time involved to encode and decode the data stream be minimized, a code that efficiently handles 8-bit data items is desirable. The Hamming rule shows that four parity bits can provide error correction for five to eleven data bits, with the latter being a perfect code. Analysis shows that overhead introduced to the data stream is modest for the range of data bits available. A Hamming (12,8,3) code, a subset of Hamming (15,11,3) offers a reasonable compromise in the bit stream. The code enables data link packets to be constructed easily by permitting one parity byte to serve two data bytes.

Although in the particular case of the (n,k,3) Hamming codes can not correct a two bit error, it can still reduce retransmission data and latency. In case of a two bit error, the receiving node can request retransmission of one bit and then correct the other bit, thus reducing retransmission. It will be appreciated by those of ordinary skill in the art that some Hamming codes (n,k,3) correct one (1) bit errors and some codes (n,k,5) correct two (2) bit errors and so on. For example, to correct k bit error/erasure, d must be at least 2k+1. Thus, the degree of possible correction depends on the correction function implemented.

Figure 3:
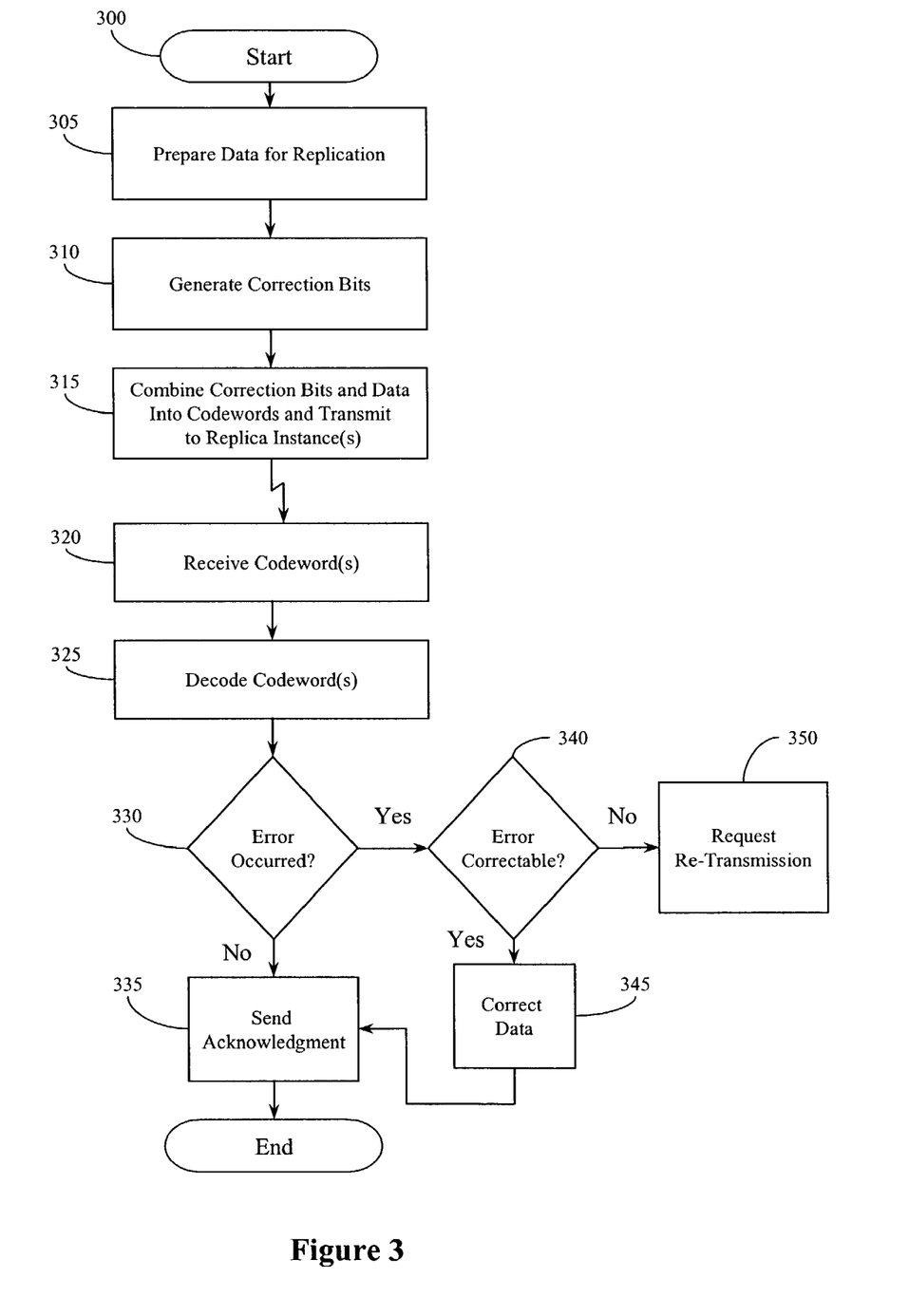
FIG. 3 is an example methodology of replicating data to a failover instance.

Illustrated in FIG. 3 is one embodiment of a methodology 300 associated with the replication of objects in a clustered system. The illustrated elements denote "processing blocks" and represent computer software instructions or groups of instructions that cause a computer to perform an action(s) and/or to make decisions. Alternatively, the processing blocks may represent functions and/or actions performed by functionally equivalent circuits such as a digital signal processor circuit, an application specific integrated circuit (ASIC), or other logic device. The diagram, as well as the other illustrated diagrams, does not depict syntax of any particular programming language. Rather, the diagram illustrates functional information one skilled in the art could use to fabricate circuits, generate computer software, or use a combination of hardware and software to perform the illustrated processing. It will be appreciated that electronic and software applications may involve dynamic and flexible processes such that the illustrated blocks can be performed in other sequences different than the one shown and/or blocks may be combined or, separated into multiple components. They may also be implemented using various programming approaches such as machine language, procedural, object oriented and/or artificial intelligence techniques. The foregoing applies to all methodologies described herein.

With reference to FIG. 3, the illustrated methodology shows actions taken by a transmitting node that transmits data from an object and by a receiving node that receives the data and creates a replica object. When an object is to be replicated to other nodes in a cluster, data from the object is prepared for replication (block 305). That may include serializing the data and configuring the data into messages based on a communication protocol, adding header information or other data. Of course, data may be transmitted in many ways other than by data packets. Correction bits are generated for each data packet (block 310) in accordance with a correction function such as a Hamming (12, 8) code. The data and correction bits are combined into a code word and transmitted to one or more other nodes in the cluster. If using multicast protocol, the code words are broadcast throughout the network.

At a receiving node, the code word is received (block 320). The code word is decoded in accordance with the Hamming code used (block 325) and logic determines if an error occurred in the transmission (block 330). As mentioned previously, when using datagram, if the entire message is received, decoding can be skipped because datagram ensures no errors, but erasures may occur. If no error occurred, meaning the code word was received accurately, the receiving node transmits an acknowledgement signal (block 335) which indicates to the transmitting node that the data was correctly received and to continue transmitting. The received data is added to the replica data and the process continues until all data for the replica is received.

If an error is detected at block 330, the error decode logic determines if the error is correctable using the known relationships of the Hamming codes (block 340). If the error is correctable, such as a one bit error, the bit is corrected (block 345) as described above, and an acknowledgement is sent (block 335). Of course, what is correctable/recoverable depends on the implemented correction function. If the error is not correctable, such as a two bit error, a request for re-transmission is sent (block 350). The request may ask for re-transmission of the two bits in error, the entire data packet, or may request just one of the bits in error. Because some Hamming codes can correct one bit errors, the receiving node only needs one of the two error bits and the other bit can be corrected. In this manner, re-transmission traffic can be reduced.

Suitable software for implementing the various components of the present system and method are readily provided by those of skill in the art using the teachings presented here and programming languages and tools such as Java, Pascal, C++, C, CGI, Perl, SQL, APIs, SDKs, assembly, firmware, microcode, and/or other languages and tools. The components embodied as software include computer-readable/executable instructions that cause a computer to behave in a prescribed manner. Any software herein, whether an entire system or a component of a system, may be embodied as an article of manufacture in a computer-readable medium as defined previously.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A system of replicating object data from a container instance within a clustered processing system, the system comprising:
   replication logic for controlling replication of object data from a container instance to one or more replica instances; and
   correction logic for generating correction data based on the object data and for generating code words by combining the object data and the correction data, the code words being transmittable to the one or more replica instances such that correctable errors in the object data can be corrected without re-transmission of the object data.

2. The system of claim 1 further including a transmitter for transmitting the code words to the one or more replica instances based on a broadcasting protocol.

3. The system of claim 1 wherein the replication logic includes a data serializer to serialize the object data into data packets having a predetermined length, and where the correction logic generates a correction data for each data packet.

4. The system of claim 1 wherein the correction logic includes an encoder to generate the correction data using a linear correction code.

5. The system of claim 4 wherein the linear correction code is a Hamming code.

6. The system of claim 1 wherein the system is embodied as computer executable instructions stored on a computer-readable medium.

7. The system of claim 1 wherein the container instance is a container for an enterprise application.

8. The system of claim 1 wherein the object data includes data from a container process within the container instance.

9. The system of claim 1 where the correction logic is configured to re-transmit a sub-set of the object data to the one or more replica instances if an error occurred in the sub-set.

10. The system of claim 1 wherein the replication logic includes means for controlling replication of object data; and
    wherein the correction logic includes means for generating the code words.

11. An article of manufacture embodied in a computer-readable storage medium for use in a computer system, the article of manufacture comprising:
    first computer executable instructions for causing a computer to establish a clustered system having at least one application instance for processing user requests;

second computer executable instructions for causing a computer to dynamically replicate the at least one application instance to at least one replica instance on one or more remote devices;

third computer executable instructions for causing a computer to generate and add correction data to the at least one application instance, the correction data allowing the one or more remote devices to recover portions of the at least one application instance if received by the at least one replica instance in error.

12. The article of manufacture as set forth in claim 11 wherein the at least one application instance is one of a Java based enterprise application or a Windows based enterprise application.

13. The article of manufacture as set forth in claim 11 wherein the third computer executable instructions include encoding instructions that cause a computer to apply a linear correction function to data from the at least one application instance to generate the correction data.

14. The article of manufacture as set forth in claim 13 wherein the linear correction function includes a Hamming code.

15. The article of manufacture as set forth in claim 11 wherein the second computer executable instructions include serialization instructions that cause a computer to serialize data from the at least one application instance into messages that are transmittable over a communication network.

16. The article of manufacture as set forth in claim 11 wherein the at least one replica instance is a failover instance that resumes processing of the user requests if the at least one application instance fails to operate.

17. A method of replicating instance data from an application instance in a clustered processing system, the method comprising:

serializing instance data from the application instance into a plurality of data packets;

for each data packet, generating and adding a set of correction messages to the data packet, the set of correction messages being encoded from the data packet based on a correction function;

transmitting each of the data packets and the set of correction messages to one or more failover instances which replicate a current state of the application instance and, if a portion of a data packet is received in error by a failover instance, re-generating the portion of the data packet by decoding the data packet and the correction messages based on the correction function.

18. The method as set forth in claim 17 wherein each of the plurality of data packets are dividing into a predetermined number of bits.

19. The method as set forth in claim 17 wherein the generating step includes applying a linear error correcting code as the correction function.

20. The method as set forth in claim 19 wherein the applying step includes applying a Hamming code as the linear error correcting code.

21. The method as set forth in claim 17 wherein the set of correction messages are generated to include one or more bits.

22. The method as set forth in claim 17 wherein the data packets and the correction messages are transmitted together based on a broadcasting protocol.

23. The method as set forth in claim 17 further including dynamically replicating the application instance to the one or more failover instances as the application instance is modified.

24. The method as set forth in claim 17 wherein the re-generating step re-generates unreceived portions of the data packet.

25. The method as set forth in claim 17 wherein the method is embodied as computer readable instructions provided by a computer-readable medium configured to perform the method of claim 17.

26. The method as set forth in claim 17 further including re-transmitting one or more bits from the portion of the data packet that was received in error by the failover instance without re-transmitting the entire data packet.

* * * * *

UNITED STATES PATENT AND TRADEMARK OFFICE
CERTIFICATE OF CORRECTION

PATENT NO. : 7,680,995 B1 Page 1 of 1
APPLICATION NO. : 10/299616
DATED : March 16, 2010
INVENTOR(S) : Kevin K. Chang It is certified that error appears in the above-identified patent and that said Letters Patent is hereby corrected as shown below:

In column 7, line 26, delete "A: G[I:A]." and insert -- A: G = [ I : A ]. --, therefor.

Signed and Sealed this

Twenty-first Day of September, 2010

David J. Kappos
*Director of the United States Patent and Trademark Office*